(12) United States Patent
Menke

(10) Patent No.: US 7,975,675 B2
(45) Date of Patent: Jul. 12, 2011

(54) HYBRID VEHICLE WITH CARBON CANISTER IN PROXIMITY TO GALVANIC CELL

(75) Inventor: Andreas Menke, Weingarten (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 230 days.

(21) Appl. No.: 12/268,787

(22) Filed: Nov. 11, 2008

(65) Prior Publication Data

US 2009/0139783 A1    Jun. 4, 2009

(30) Foreign Application Priority Data

Dec. 4, 2007   (DE) .................... 10 2007 058 197

(51) Int. Cl.
*F02M 33/00*   (2006.01)

(52) U.S. Cl. ........................................ 123/519

(58) Field of Classification Search .......... 180/65.31, 180/65.22, 65.21, 65.27, 65.275, 68.5, 309; 123/518, 519; 220/749; 701/22; 903/951, 903/952

See application file for complete search history.

(56) References Cited

U.S. PATENT DOCUMENTS

| | | | | |
|---|---|---|---|---|
| 4,475,522 A | * | 10/1984 | Oonaka ................. | 123/520 |
| 4,572,394 A | * | 2/1986 | Tanahashi et al. ......... | 220/86.2 |
| 4,630,581 A | * | 12/1986 | Shibata .................. | 123/325 |
| 4,700,682 A | * | 10/1987 | Ota et al. ............... | 123/516 |
| 4,793,839 A | * | 12/1988 | Hayashida et al. ......... | 96/130 |
| 4,872,439 A | * | 10/1989 | Sonoda et al. ............ | 123/519 |
| 4,887,578 A | * | 12/1989 | Woodcock et al. .......... | 123/519 |
| 5,080,421 A | * | 1/1992 | Otowa et al. ............. | 296/97.22 |
| 5,111,900 A | | 5/1992 | Leitermann | |
| 5,592,922 A | | 1/1997 | Denz | |
| 5,702,125 A | * | 12/1997 | Nakajima et al. .......... | 280/834 |
| 5,855,198 A | * | 1/1999 | Nakajima et al. .......... | 123/520 |
| 6,098,601 A | * | 8/2000 | Reddy .................... | 123/520 |
| 6,182,641 B1 | * | 2/2001 | Yamada et al. ............ | 123/519 |
| 6,557,534 B2 | * | 5/2003 | Robichaux et al. ......... | 123/520 |
| 6,644,004 B2 | * | 11/2003 | Reimers et al. ........... | 56/14.7 |
| 6,689,196 B2 | * | 2/2004 | Amano et al. ............. | 96/112 |

(Continued)

FOREIGN PATENT DOCUMENTS

DE        38 05 711 A1      9/1989

(Continued)

OTHER PUBLICATIONS

German Search Report dated Sep. 18, 2008 with English translation (Nine (9) pages).

*Primary Examiner* — Jeffrey J Restifo
*Assistant Examiner* — Brodie Follman
(74) *Attorney, Agent, or Firm* — Gerald E. Hespos; Michael J. Porco

(57) ABSTRACT

A hybrid vehicle is optionally driven by an electrical machine which can be supplied with power from a galvanic cell or which, during a generating operation, supplies the galvanic cell with power, and by an internal-combustion engine which can be supplied with a combustible liquid from a tank. An activated carbon canister is assigned to the tank for collecting vapors of the combustible liquid, the activated carbon canister being connectible, as required, with the intake system of the internal-combustion engine for carrying out a scavenging, wherein the activated carbon canister is positioned in the area of the galvanic cell.

13 Claims, 2 Drawing Sheets

U.S. PATENT DOCUMENTS

| | | | |
|---|---|---|---|
| 6,722,348 B2* | 4/2004 | Nagasaki et al. | 123/520 |
| 6,736,229 B1* | 5/2004 | Amori et al. | 180/68.5 |
| 7,114,492 B2 | 10/2006 | Reddy | |
| 7,318,424 B2* | 1/2008 | Callahan et al. | 123/518 |
| 7,347,191 B2* | 3/2008 | Atwood et al. | 123/516 |
| 7,448,367 B1* | 11/2008 | Reddy et al. | 123/520 |
| 7,513,244 B2* | 4/2009 | Potier | 123/519 |
| 7,681,557 B2* | 3/2010 | Kim | 123/519 |
| 2002/0009648 A1* | 1/2002 | Buchner et al. | 429/254 |
| 2002/0028380 A1* | 3/2002 | Tanjo et al. | 429/209 |
| 2002/0079149 A1* | 6/2002 | Kotre et al. | 180/65.3 |
| 2002/0174857 A1* | 11/2002 | Reddy et al. | 123/520 |
| 2004/0031469 A1* | 2/2004 | Reddy | 123/519 |
| 2005/0109327 A1* | 5/2005 | Reddy | 123/519 |
| 2006/0065253 A1* | 3/2006 | Reddy | 123/520 |
| 2006/0165393 A1* | 7/2006 | Yamada | 388/806 |
| 2007/0089442 A1 | 4/2007 | Tsuchiya | |
| 2007/0113831 A1* | 5/2007 | Hoke et al. | 123/519 |
| 2007/0141430 A1* | 6/2007 | Huang et al. | 429/34 |
| 2008/0302341 A1* | 12/2008 | Reddy | 123/520 |
| 2009/0084363 A1* | 4/2009 | Reddy | 123/520 |
| 2009/0308358 A1* | 12/2009 | Essig | 123/518 |
| 2009/0320805 A1* | 12/2009 | Lang et al. | 123/518 |
| 2009/0320806 A1* | 12/2009 | Lang et al. | 123/519 |
| 2010/0011746 A1* | 1/2010 | Lupescu | 60/278 |
| 2010/0012099 A1* | 1/2010 | Kerns et al. | 123/520 |
| 2010/0086478 A1* | 4/2010 | Edlund | 423/650 |
| 2010/0094493 A1* | 4/2010 | Atsumi | 701/22 |

FOREIGN PATENT DOCUMENTS

| | | |
|---|---|---|
| DE | 40 31 873 A1 | 4/1992 |
| DE | 41 40 090 A1 | 6/1993 |
| DE | 44 08 869 A1 | 9/1995 |
| DE | 11 2005 000 060 T5 | 9/2006 |
| WO | WO 2006/008301 A1 | 1/2006 |

* cited by examiner

HYBRID VEHICLE WITH CARBON CANISTER IN PROXIMITY TO GALVANIC CELL

CROSS REFERENCE TO RELATED APPLICATION

This application claims priority under 35 U.S.C. §119 to German Patent Application No. DE 2007 058 197.3, filed Dec. 4, 2007, the entire disclosure of which is herein expressly incorporated by reference.

BACKGROUND AND SUMMARY OF THE INVENTION

The invention relates to a hybrid vehicle optionally driven by an electrical machine, which can be supplied with power from a galvanic cell or which, during a generating operation, supplies the galvanic cell with power, and by an internal-combustion engine which can be supplied with a combustible liquid from a tank. In these types of hybrid vehicles, an activated carbon canister, as an intermediate storage device for hydrocarbons, is also installed between the fuel tank and the environment in the tank ventilation system. This intermediate storage device, controlled by way of the electronic system of the engine, is conventionally regenerated by an air stream. In this case, air is guided over the carbon particles of the activated carbon canister which are occupied by hydrocarbons, whereby the hydrocarbons are detached and are conveyed to the internal-combustion engine by way of the air stream. This air stream from the activated carbon canister charged with hydrocarbons is admixed to the combustion air and is burnt.

U.S. Pat. No. 7,114,492 describes a motor vehicle, in the case of which, in the tank ventilation system, a washer for short-chain hydrocarbons on the output side of the activated carbon canister is provided in the proximity of the exhaust system of the vehicle in order to heat the washer.

International patent document WO 2006/008301 relates to the heating of the scavenging air flow for an activated carbon canister of a tank ventilation system by use of a heat exchanger on the exhaust system of the motor vehicle. In this case, the exhaust system and the tank are arranged in an adjacent manner, but are thermally insulated from one another.

German patent document DE 4140090 relates to an activated carbon canister for the tank ventilation system of a motor vehicle, which is arranged between the exhaust system and the fuel tank of the motor vehicle.

It is an object of the invention to further develop the hybrid vehicle of the above-mentioned type and, particularly, to improve its tank ventilation system.

This object is achieved by providing a hybrid vehicle optionally drivable by an electrical machine or an internal-combustion engine. The electrical machine can be supplied with power from a galvanic cell or, during a generating operation, supplies the galvanic cell with power. The internal-combustion engine is supplied with a combustible liquid from a fuel tank. An activated carbon canister is assigned to the fuel tank for collecting vapors of the combustible liquid. The activated carbon canister is positioned in an area of the galvanic cell, and is connectable, as required, with an intake system of the internal-combustion engine for carrying out a scavenging. Advantageous developments and further developments of the invention are described herein.

According to the invention, the activated carbon canister assigned to the fuel tank of an internal-combustion engine, for collecting fuel vapors, is positioned in the area of the galvanic cell from which the electrical machine of the hybrid vehicle can be supplied with current in order to operate the latter as an electric motor or which is supplied with current during the generating operation of the electrical machine. As a result of the positioning of the activated carbon canister according to the invention, the waste heat occurring at the galvanic cell can be used for heating the activated carbon canister. In this case, the invention utilizes the recognition that, in the case of a hybrid vehicle, a lower heat entry or a lower generating of vapor occurs in the fuel tank. This is a result of the fact that, at least at times, the internal-combustion engine is out of operation.

The electric delivery device (fuel pump), which causes an entry of heat into the fuel, is therefore less frequently in operation in the case of a hybrid vehicle. In addition, when there is a return flow, hot fuel is less frequently returned into the fuel tank. As a result of the correspondingly lower fuel-vapor quantity in the case of a hybrid vehicle compared with a conventional motor vehicle, the amount of fuel vapors to be absorbed by the assigned activated carbon canister is also lower. However, it should also be taken into account here that, because of the only temporarily operated internal-combustion engine, the scavenging phases of the activated carbon canister also turn out to be less frequent. Summarizing, although the activated carbon canister in a hybrid vehicle has to adsorb less fuel vapor in comparison with a conventional vehicle, it is also scavenged less frequently. As a result, the required adsorption in the case of an activated carbon canister of a hybrid vehicle is lower than in the case of a conventional vehicle. Thus, the provided heating of the activated carbon canister, as a result of the placing provided according to the invention in the area of the galvanic cell, specifically does not lead to a reduced efficiency of the tank ventilation. On the contrary, the increased temperature results in an improved regeneration of the adsorbed hydrocarbons during a scavenging operation, whereby the latter does not have to be carried out as frequently. In other words, according to the invention, the equilibrium between adsorption and regeneration of the activated carbon canister is shifted in that the temperature of the activated carbon canister is raised. In this case, as a result of a corresponding placing of the activated carbon canister, a desired state of equilibrium is adjusted corresponding to a defined (average) temperature.

It is advantageous to provide the galvanic cell as a high-voltage battery pack, particularly of the nickel-metal-hydride (NiMH) or lithium-ion type. On the one hand, these are proven and efficient suppliers of power for an electrical machine of the hybrid vehicle. On the other hand, they supply a corresponding waste heat, whereby the correspondingly positioned activated carbon canister is heated and its regeneration is thereby improved. Naturally, other types of galvanic cells can also be provided, such as fuel cells and lead accumulators. Furthermore, when several galvanic cells are used in the hybrid vehicle, a positioning of the activated carbon canister on a galvanic cell favorable, for example, with respect to installation space aspects may be provided.

The galvanic cell and the activated carbon canister are, preferably, provided in the area of the trunk recess or space of the hybrid vehicle. As a result of the corresponding weight of the galvanic cell, a low center of gravity of the vehicle is thereby obtained. In addition, in this area, sufficient installation space is normally available. In the case of this type of configuration, another advantage is obtained by the arrangement according to the invention. In that the relatively voluminous activated carbon canister is positioned correspondingly, it can be used as a mechanical guard shield for the relatively susceptible galvanic cell. By a corresponding placement, the activated carbon canister can, for example, absorb energies in the event of a crash of the hybrid vehicle and/or can be used as a stone guard.

It is particularly advantageous to configure the exhaust gas system of the internal-combustion engine of the hybrid vehicle such that the activated carbon canister is positioned between the galvanic cell and a part of the exhaust system. For example, a catalytic converter, a muffler, and/or a pipe of the exhaust system may extend in the proximity of the activated carbon canister. As a result of the additional waste heat of the exhaust system, this leads to a further temperature increase and thus a correspondingly improved regeneration in the activated carbon canister.

A favorable fastening possibility of the activated carbon canister is obtained when the canister is fastened to a covering of the galvanic cell. The utilization of such coverings or fastenings eliminates the necessity of providing additional fastening possibilities for the activated carbon canister. This permits a particularly material-saving construction.

Other objects, advantages and novel features of the present invention will become apparent from the following detailed description of one or more preferred embodiments when considered in conjunction with the accompanying drawing.

BRIEF DESCRIPTION OF THE DRAWING

The figures illustrate a preferred embodiment of the invention, in which an activated carbon canister is arranged in a hybrid vehicle, with FIG. 1 being a schematic side elevational view of the vehicle, FIG. 2 being a schematic top plan view and FIG. 3 being a detailed bottom plan view of a portion of the vehicle.

DETAILED DESCRIPTION OF THE DRAWING

Figure 1:
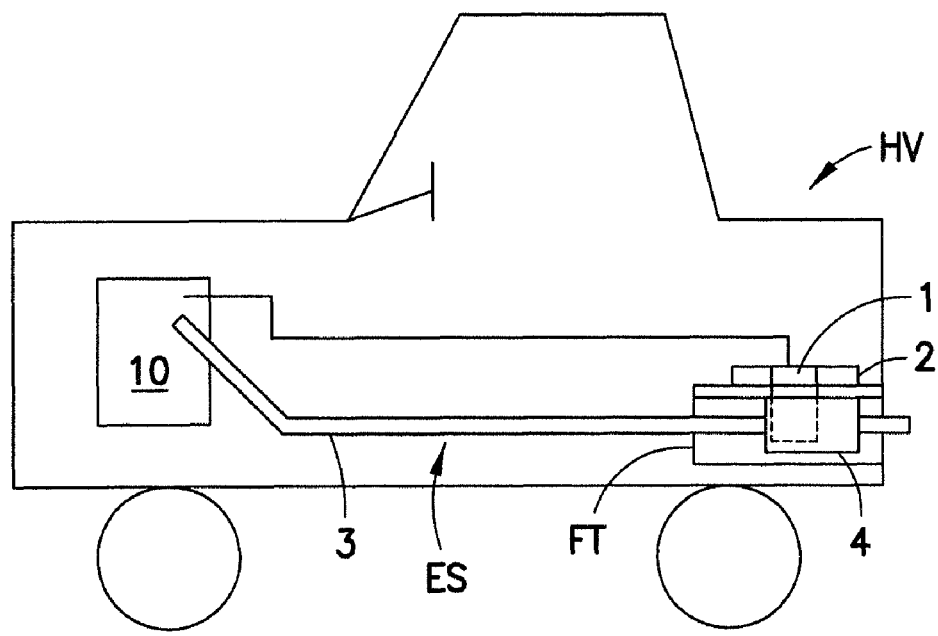
Figure 2:
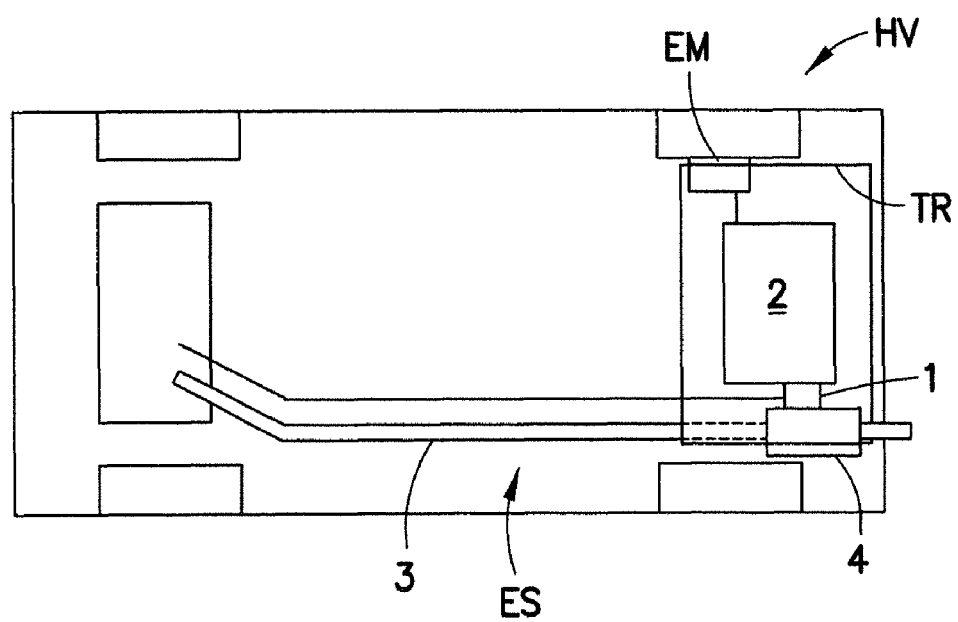
Figure 3:
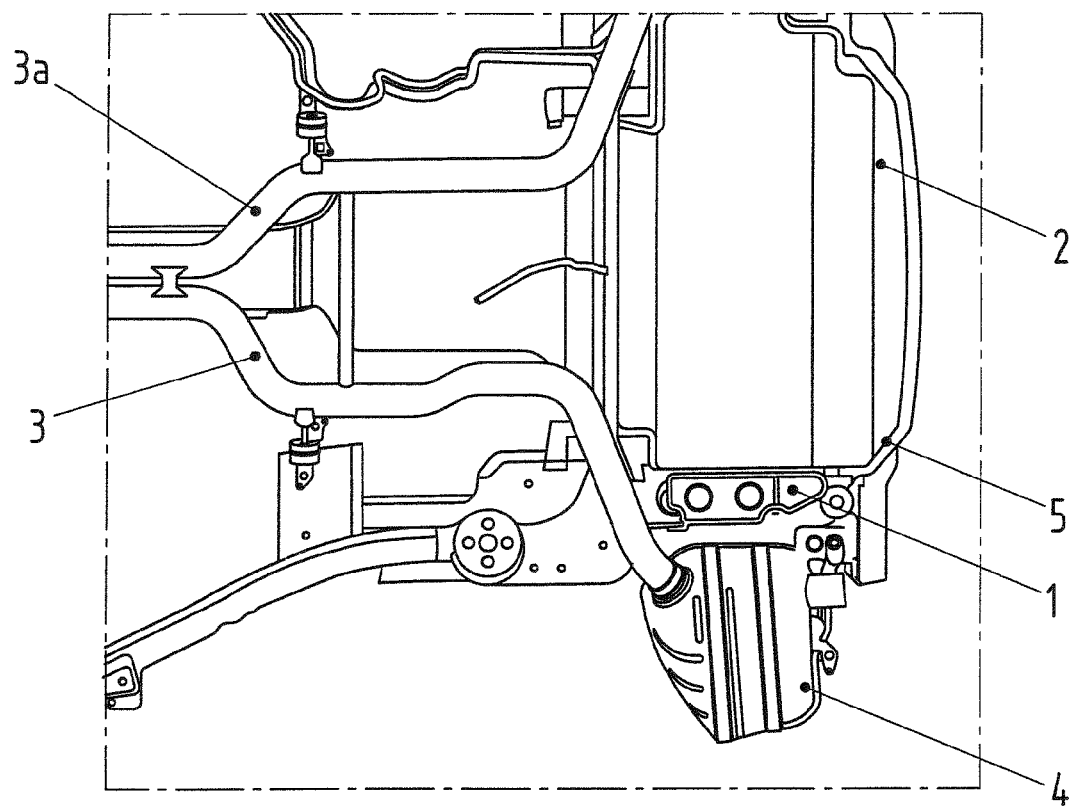

The figures shows a partial arrangement in a hybrid vehicle HV, including an activated carbon canister 1, a galvanic cell 2 for supplying an electrical machine EM of the hybrid vehicle HV, as well as pipes 3, 3a and an end box 4 of the exhaust system ES of the internal-combustion engine 10 of the hybrid vehicle HV. In this case, the activated carbon canister 1 is assigned to the tank ventilation system of a fuel tank FT. Furthermore, the activated carbon canister 1 is fastened to a lateral cover 5 for the galvanic cell 2 and preferably are positioned in an area of the trunk TR. In addition, the exhaust system ES is configured such that the end box 4 is positioned in the proximity of the activated carbon canister 1.

The corresponding construction, i.e., the arrangement of the activated carbon canister 1, the exhaust system ES and the galvanic cell 2, is selected such that, in the normal operation of the hybrid vehicle HV, a desired temperature increase occurs in the activated carbon canister 1, compared with a conventional motor vehicle, and thus a shift toward an increased regeneration as well as a reduced adsorption of the activated carbon canister 1.

For this purpose, the temperature is adjusted as desired by corresponding distances of the individual components with respect to one another. As a result of such a new positioning of the activated carbon canister 1, it becomes particularly possible to take an activated carbon canister 1 from a conventional motor vehicle and place it in the corresponding hybrid vehicle HV without carrying out a high-expenditure new construction. On the contrary, the required regeneration of the activated carbon canister 1 can be adjusted by a corresponding temperature increase of the activated carbon canister 1. This is achieved by the described placement of the activated carbon canister 1 on the components 2, 4 heating the canister. The use of the same activated carbon canister 1 therefore becomes possible in a hybrid version of the motor vehicle as in the corresponding conventional motor vehicle, which leads to a corresponding saving of development costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid vehicle optionally driven by an electrical machine and an internal-combustion engine, the hybrid vehicle comprising:
a galvanic cell for supplying power to the electrical machine or for receiving power during a generating operation of the electrical machine;
a tank for storing a combustible liquid supplied to the internal-combustion engine;
an activated carbon canister assigned to the tank for collecting vapors of the combustible liquid, the activated carbon canister being connectible, as required, with an intake system of the internal-combustion engine for carrying out a scavenging; the activated carbon canister being positioned adjacent the galvanic cell so that heat occurring at the galvanic cell heats the activated carbon canister.

2. The hybrid vehicle according to claim 1, wherein the galvanic cell is constructed as a high-voltage battery pack.

3. The hybrid vehicle according to claim 2, wherein the galvanic cell constructed as the high-voltage battery pack is one of a nickel-metal-hydride (NiMH) and a lithium-ion type.

4. The hybrid vehicle according to claim 1, further comprising a trunk recess, the galvanic cell and the activated carbon canister being arranged in an area of the trunk recess.

5. The hybrid vehicle according to claim 3, further comprising a trunk recess, the galvanic cell and the activated carbon canister being arranged in an area of the trunk recess.

6. The hybrid vehicle according to claim 4, further comprising a covering for the galvanic cell, wherein the activated carbon canister is fastened on the covering in the area of the galvanic cell.

7. The hybrid vehicle according to claim 5, further comprising a covering for the galvanic cell, wherein the activated carbon canister is fastened on the covering in the area of the galvanic cell.

8. The hybrid vehicle according to claim 1, further comprising an exhaust gas system of the internal combustion engine, wherein the activated carbon canister is arranged between the galvanic cell and a part of the exhaust gas system.

9. The hybrid vehicle according to claim 3, further comprising an exhaust gas system of the internal-combustion engine, wherein the activated carbon canister is arranged between the galvanic cell and a part of the exhaust gas system.

10. The hybrid vehicle according to claim 4, further comprising an exhaust gas system of the internal-combustion engine, wherein the activated carbon canister is arranged between the galvanic cell and a part of the exhaust gas system.

11. A hybrid vehicle optionally driven by an electrical machine and an internal-combustion engine, the hybrid vehicle comprising:

a galvanic cell for supplying power to the electrical machine or for receiving power during a generating operation of the electrical machine, the galvanic cell having a covering;

a tank for storing a combustible liquid supplied to the internal-combustion engine; and an activated carbon canister assigned to the tank for collecting vapors of the combustible liquid, the activated carbon canister being connectible, as required, with an intake system of the internal-combustion engine for carrying out a scavenging, the activated carbon canister being fastened on the covering of the galvanic cell.

12. The hybrid vehicle according to claim 11, further comprising an exhaust gas system of the internal-combustion engine, wherein the activated carbon canister is arranged between the galvanic cell and a part of the exhaust gas system.

13. The hybrid vehicle according to claim 11, further comprising a trunk recess, the galvanic cell and the activated carbon canister being arranged in an area of the trunk recess.

* * * * *